(12) United States Patent
Thotempudi et al.

(10) Patent No.: US 11,295,726 B2
(45) Date of Patent: **\*Apr. 5, 2022**

(54) SYNTHETIC NARROWBAND DATA GENERATION FOR NARROWBAND AUTOMATIC SPEECH RECOGNITION SYSTEMS

(71) Applicant: International Business Machines Corporation, Armonk, NY (US)

(72) Inventors: Vamshi Krishna Thotempudi, San Jose, CA (US); Pierre-Hadrien Arnoux, New York, NY (US); Vibha S. Sinha, Santa Clara, CA (US)

(73) Assignee: International Business Machines Corporation, Armonk, NY (US)

( \* ) Notice: Subject to any disclaimer, the term of this patent is extended or adjusted under 35 U.S.C. 154(b) by 120 days.

This patent is subject to a terminal disclaimer.

(21) Appl. No.: 16/377,976

(22) Filed: Apr. 8, 2019

(65) Prior Publication Data

US 2020/0320979 A1    Oct. 8, 2020

(51) Int. Cl.
| | |
|---|---|
| G10L 15/02 | (2006.01) |
| G10L 15/30 | (2013.01) |
| G10L 15/06 | (2013.01) |
| G06F 3/00 | (2006.01) |
| G10L 15/26 | (2006.01) |
| G10L 17/04 | (2013.01) |

(52) U.S. Cl.
CPC ............ *G10L 15/063* (2013.01); *G06F 3/00* (2013.01); *G10L 15/26* (2013.01); *G10L 17/04* (2013.01)

(58) Field of Classification Search
None
See application file for complete search history.

(56) References Cited

U.S. PATENT DOCUMENTS

| | | | | |
|---|---|---|---|---|
| 5,893,059 | A | \* | 4/1999 | Raman ................... G10L 15/063 704/256.2 |
| 6,075,844 | A | \* | 6/2000 | Goldberg .............. H04M 1/658 379/88.04 |
| 6,249,766 | B1 | \* | 6/2001 | Wynblatt ................ G10L 21/00 704/211 |
| 6,985,492 | B1 | \* | 1/2006 | Thi ................... H04L 29/06027 370/429 |
| 7,333,475 | B2 | | 2/2008 | LeBlanc et al. |
| 7,346,507 | B1 | \* | 3/2008 | Natarajan ............ G10L 15/063 379/88.07 |

(Continued)

OTHER PUBLICATIONS

List of IBM Patents or Applications Treated as Related, 2019.

(Continued)

*Primary Examiner* — Seong-Ah A Shin
(74) *Attorney, Agent, or Firm* — Terrile, Cannatti & Chambers, LLP; Michael Rocco Cannatti (57) ABSTRACT

A system and apparatus are provided for generating synthetic telephony narrowband data for training an automatic speech recognition model by receiving a broadband audio data file and then initiating a telephony call using a preconfigured telephone provider to play the broadband audio data file in the telephony call and to record and store audio data generated by transmission of the broadband audio data file in the telephony call, thereby generating the synthetic telephony narrowband data file from the broadband audio data file.

11 Claims, 4 Drawing Sheets

(56) References Cited

U.S. PATENT DOCUMENTS

| | | | |
|---|---|---|---|
| 7,352,776 B1* | 4/2008 | Hauptmann | H04Q 11/0442 370/488 |
| 7,707,029 B2 | 4/2010 | Seltzer et al. | |
| 7,983,916 B2 | 7/2011 | Chengalvarayan | |
| 8,438,026 B2 | 5/2013 | Fischer et al. | |
| 8,719,039 B1* | 5/2014 | Sharifi | G10L 15/02 704/251 |
| 9,454,958 B2* | 9/2016 | Li | G10L 15/16 |
| 9,667,776 B1* | 5/2017 | Dux | H04M 3/42221 |
| 9,697,822 B1* | 7/2017 | Naik | G10L 15/22 |
| 9,805,712 B2 | 10/2017 | Li et al. | |
| 9,953,636 B2* | 4/2018 | Cohen | G10L 15/06 |
| 10,388,272 B1* | 8/2019 | Thomson | G06F 40/44 |
| 10,621,974 B2* | 4/2020 | Miki | G10L 17/04 |
| 2001/0033583 A1* | 10/2001 | Rabenko | H04N 21/2383 370/429 |
| 2002/0065656 A1* | 5/2002 | Reding | G10L 15/30 704/E15.047 |
| 2003/0086541 A1* | 5/2003 | Brown | H04M 3/4228 704/E15.045 |
| 2003/0147512 A1* | 8/2003 | Abburi | H04M 3/5307 379/88.22 |
| 2003/0219009 A1* | 11/2003 | Unger | H04M 7/124 370/352 |
| 2006/0190254 A1 | 8/2006 | Iser et al. | |
| 2007/0016417 A1* | 1/2007 | Sung | G10L 19/035 704/230 |
| 2009/0030676 A1 | 1/2009 | Xu et al. | |
| 2010/0057475 A1* | 3/2010 | Sollenberger | G10L 21/00 704/500 |
| 2010/0057476 A1* | 3/2010 | Sudo | G10L 21/038 704/500 |
| 2010/0191525 A1* | 7/2010 | Rabenko | H04L 29/06027 704/211 |
| 2013/0179168 A1* | 7/2013 | Bae | G10L 15/08 704/248 |
| 2014/0032226 A1* | 1/2014 | Raju | G10L 19/0212 704/500 |
| 2014/0315520 A1* | 10/2014 | Jaiswal | H04W 4/16 455/412.1 |
| 2015/0095034 A1* | 4/2015 | Acker | G10L 13/033 704/260 |
| 2016/0042734 A1* | 2/2016 | Cetinturk | G10L 25/12 704/236 |
| 2016/0165347 A1* | 6/2016 | Nyshadham | H04R 3/005 381/119 |
| 2016/0275959 A1* | 9/2016 | Choo | G10L 19/09 |
| 2017/0148447 A1* | 5/2017 | Atti | G10L 25/51 |
| 2017/0213544 A1 | 7/2017 | Dhoolia et al. | |
| 2017/0270939 A1* | 9/2017 | Mundt | G10L 19/0017 |
| 2018/0190273 A1* | 7/2018 | Karimli | G10L 15/02 |
| 2018/0197563 A1* | 7/2018 | Sakai | G10L 21/00 |
| 2018/0341632 A1 | 11/2018 | Akkiraju et al. | |
| 2020/0175961 A1* | 6/2020 | Thomson | G10L 15/22 |
| 2020/0349943 A1* | 11/2020 | Elangovan | G06F 16/156 |

OTHER PUBLICATIONS

A.R. Stauffer et al., Speaker Recognition on Lossy Compressed Speech Using the Speex Codec, Proceedings of the Annual Conference of the International Speech Communication Association, Interspeech Sep. 6-10, 2009, Brighton UK, 2363-2366.

Speex.org, Speex: A Free Codec for Free Speech, downloaded Nov. 29, 2018.

Kehuang Li et al., DNN-Based Speech Bandwidth Expansion and Its Application to Adding High-Frequency Missing Features for Automatic Speech Recognition of Narrowband Speech, INTERSPEECH 2015, https://www.isca-speech.org/archive/interspeech_2015/papers/i15_2578.pdf.

Y. Nakatoh et al., Generation of Broadband Speech From Narrowband Speech Using Piecewise Linear Mapping, Electronics and Communications in Japan (Part II Electronics), 85(8):44-53, Aug. 2002, https://pdfs.semanticscholar.org/924d/a32e78ece798a41dd312173e63e30ae278c0.pdf.

* cited by examiner

SYNTHETIC NARROWBAND DATA GENERATION FOR NARROWBAND AUTOMATIC SPEECH RECOGNITION SYSTEMS

BACKGROUND OF THE INVENTION

Field of the Invention

The present invention relates in general to the field of data processing. In one aspect, the present invention relates to mechanisms for improving automatic speech recognition.

Description of the Related Art

In order for cognitive computing systems (such as the IBM Watson™ artificially intelligent computer system or and other natural language question answering systems) to translate spoken words into text, the cognitive computing system must be trained to provide a speech recognition service, also known as automatic speech recognition (ASR). Typically, the process for training ASR systems requires thousands of hours of speech data with their transcriptions, where an individual speaker reads sections of text into the ASR system which then analyzes the person's specific voice and fine tunes the recognition of that person's speech, resulting in more accurate transcription. One of the challenges with speech recognition stems from the sound quality variation among audio inputs be processed for speech recognition, such as variations in speech energy, audio quality, signal bandwidth, and other input signal fluctuations. For example, ASR systems are likely to be used with applications that send speech audio through telephonic lines (e.g., call centers, audio chat bots, etc.) and also with applications that directly use speech audio or that receive speech audio through voice over iP (VoIP). Accordingly, ASR models are designed to be trained and served on two types of audio, namely telephony narrowband audio (for telephony purposes) and broadband audio (for non-telephony usages). This requirement doubles the amount of data needed to be collected for each language (e.g., English, French, Chinese, etc.) and can also increase costs by up to an order of magnitude as narrowband data is much more expensive to collect than the broadband data. This increased expense results from the additional signal modelling requirements for telephony narrowband audio that are needed to account for the signal alterations or distortions (e.g., compressions, decompressions, bandwidth alterations, frame drops, etc.) that can occur with speech audio signals transmitted through telephonic lines. These alterations/distortions can be dynamic since telephony providers may compress the signal, depending on the traffic on the line. While there are simple tools for generating narrowband telephony data by downsampling a broadband audio file and/or performing audio compression, they do not accurately or realistically reproduce narrowband telephony data, which in turn makes ASR on telephonic data a very complex process that requires specialized models to be trained on telephony data directly. As a result, the existing solutions for training ASR systems to correctly account for dynamic fluctuations in narrowband telephony speech audio inputs are extremely difficult at a practical level.

SUMMARY

Broadly speaking, selected embodiments of the present disclosure provide an information handling system, method, and apparatus for synthesizing telephony narrowband audio from a broadband audio file by initiating a telephone call through a telephone provider to play the broadband audio file over the telephone call and to record the telephone call on the other end, thereby generating and storing a telephony narrowband audio version of the broadband audio file that can be used for training automatic speech recognition models. Given a set or pre-collected broadband audio files, selected embodiments of a telephony narrowband audio synthesizer will automatically generate narrowband telephony audio files that contain the same audio as the broadband audio files by initiating a telephone call to telephonic provider, playing broadband audio file through the call, and recording the call on the other end.

The foregoing is a summary and thus contains, by necessity, simplifications, generalizations, and omissions of detail. Thus, persons skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a number of terms in the following description will be generally understood to have their plain and ordinary meaning. For example, the term "narrowband" is generally understood to refer to an audio file of 8 kHz sampling rate or an ASR model built on such data. In addition, the term "broadband" is generally understood to refer to an audio file of 16 kHz sampling rate or an ASR model built on such data.

In addition, the term "telephony data" is generally understood to refer to a narrowband audio file that was altered by the telephonic lines.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
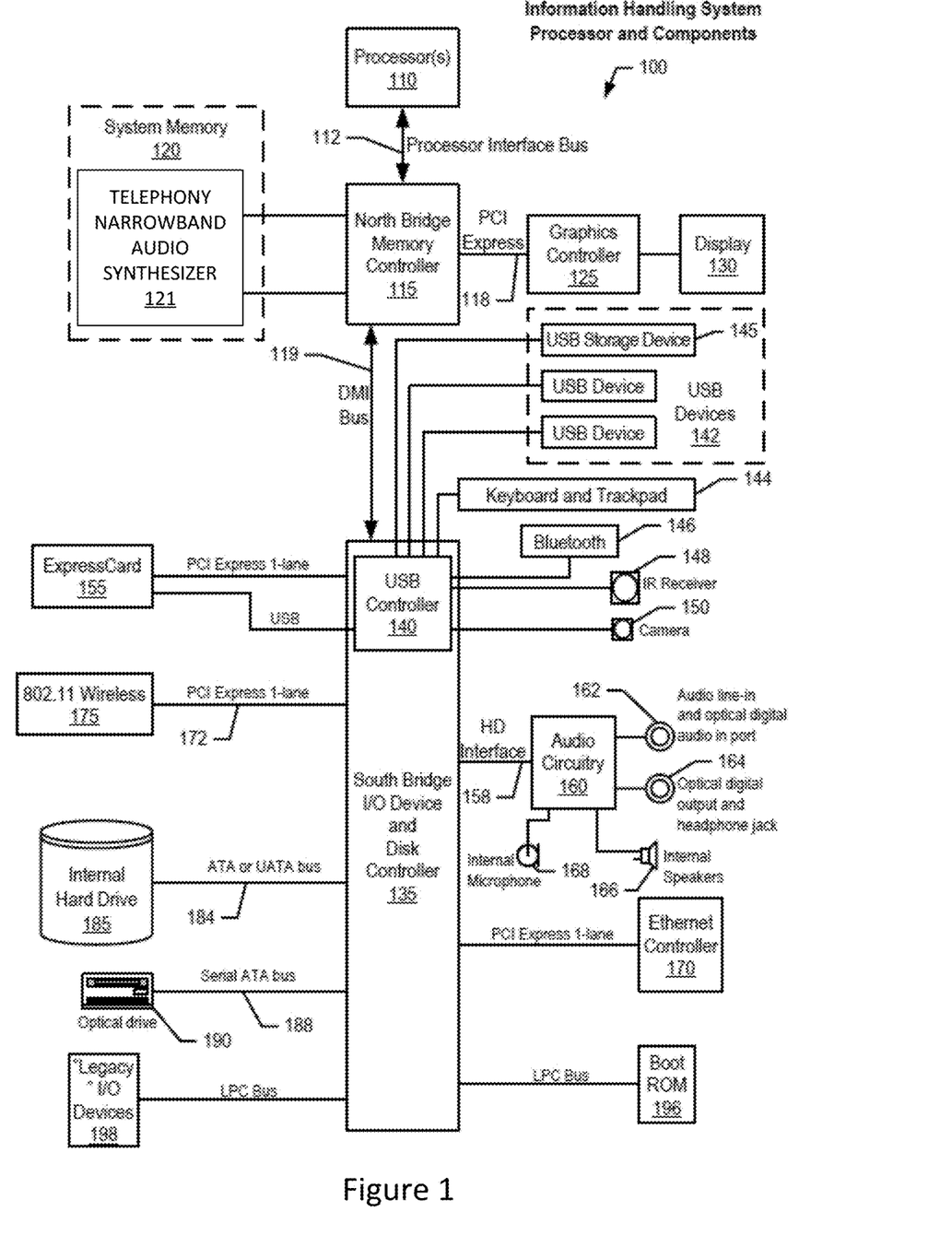
FIG. 1 depicts a block diagram of an information handling system having a telephony narrowband audio synthesizer in accordance with selected embodiments of the present disclosure.

FIG. 1 illustrates information handling system 100, more particularly, a processor and common components, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. In the system memory 120, a variety of programs may be stored in one or more memory devices, including a telephony narrowband audio synthesizer module 221 which may be invoked to automatically generate narrowband telephony audio files that contain the same audio as the broadband audio files by initiating a telephone call to telephonic provider, playing broadband audio file through the call, and recording the call on the other end. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory. In addition, an information handling system need not necessarily embody the north bridge/south bridge controller architecture, as it will be appreciated that other architectures may also be employed.

Figure 2:
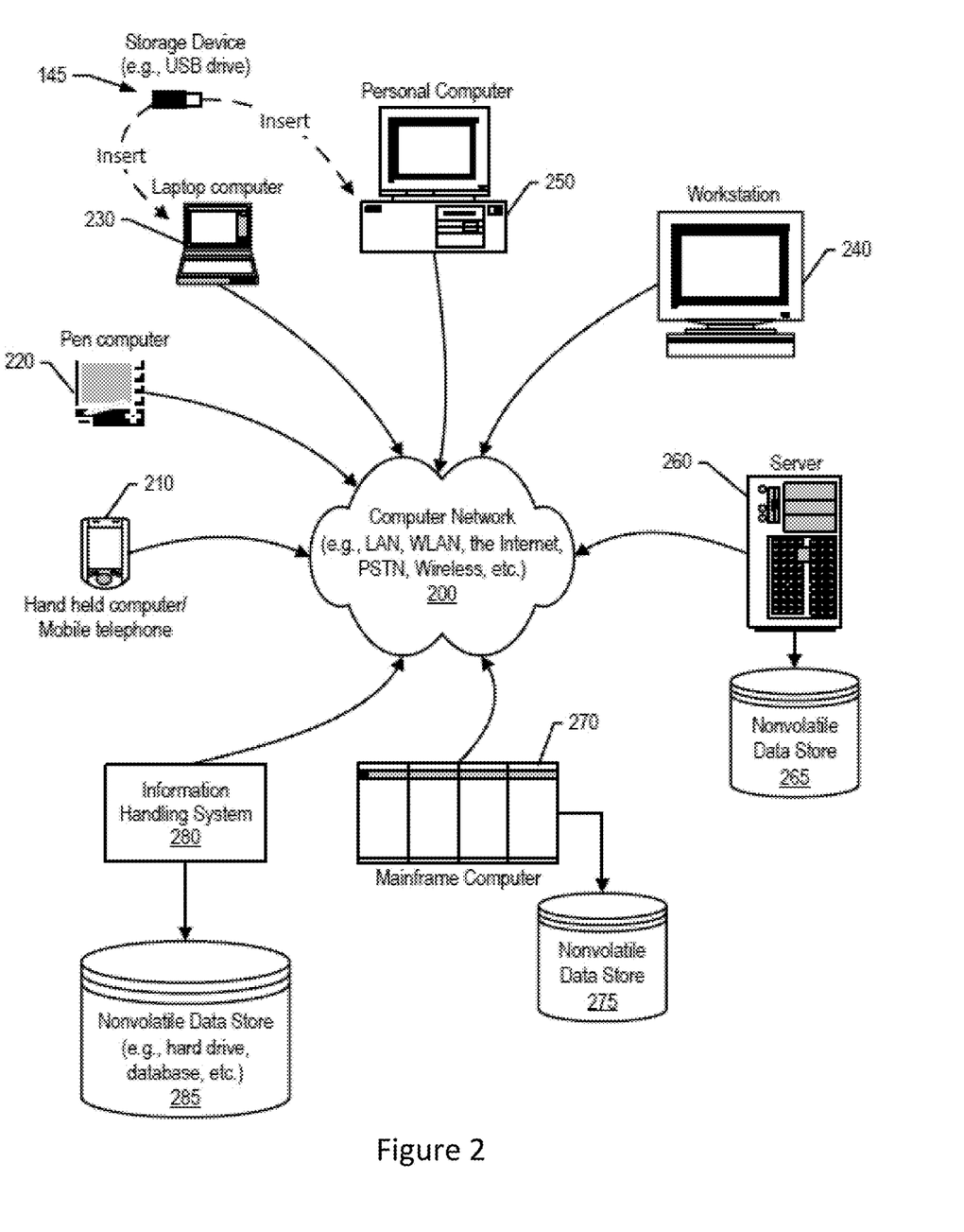
FIG. 2 depicts a network environment in which an information handling system uses a telephony narrowband audio synthesizer in accordance with selected embodiments of the present disclosure.

FIG. 2 depicts a network environment 200 in which an information handling system uses a telephony narrowband audio synthesizer in accordance with selected embodiments of the present disclosure. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop or notebook computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, there are simple tools available for generating narrowband telephony audio by down-sampling and/or compressing an audio input file, but such tools do not generate realistic narrowband telephony audio since they do not apply dynamic distortions and alternations to the audio input file such as occur when audio is actually transmitted over a telephone line. The ability to realistically synthesize narrowband telephony audio from broadband input audio without imposing excessive cost and complexity on the overall system is provided by the disclosure of a synthetic narrowband data generator system which automatically sends a broadband audio data over a configured telephony call. To this end, the system monitors a first repository for a new broadband audio entry. Upon detecting the new broad band audio entry, the system initiates a pre-configured telephony call through a telephone provider, and then sends the new broadband audio entry to the telephone provider. In addition, the system receives the telephony call and records the audio data received during the phone call in a narrow band format. Responsive to receiving the synthesized narrowband audio, an automatic speech recognition model may be trained by both the broadband audio and corresponding synthesized narrowband audio.

Figure 3:
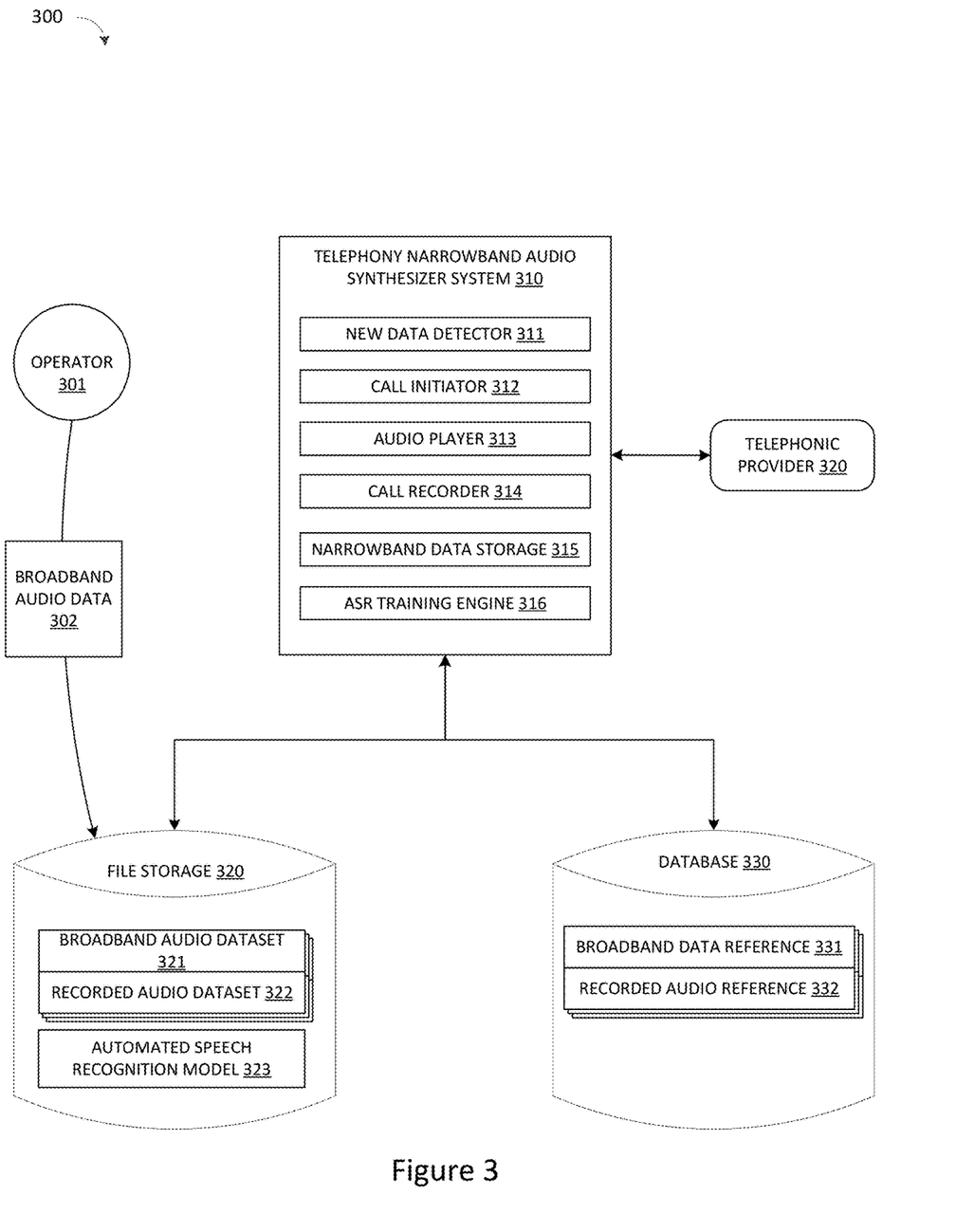
FIG. 3 diagrammatically depicts an automatic speech recognition training environment which uses a telephony narrowband audio synthesizer system to synthesize narrowband telephony audio files from broadband audio files in accordance with selected embodiments of the present disclosure.

To provide additional details for an improved understanding of selected embodiments of the present disclosure, reference is now made to FIG. 3 which is a diagrammatical depiction of an automatic speech recognition training environment 300 which uses a telephony narrowband audio synthesizer system 310 to synthesize narrowband telephony audio files from broadband audio files. The automatic speech recognition training environment 300 uses the telephony narrowband audio synthesizer system 310 in combination with a telephonic provider 320 to collect and generate broadband and narrowband audio training datasets 321, 322 in the file storage 320 for use in training the automatic speech recognition model 323. The telephony narrowband audio synthesizer system 310 includes a new data detector module/service 311, a call initiator module/service 312, an audio player module/service 313, a call recorder module/service 314, a narrowband data storage module/service 315, and ASR training engine 316. As will be appreciated, the telephony narrowband audio synthesizer system 310 may include more, less, and/or different services that what is shown in FIG. 3 and described herein.

As disclosed, the file storage database 320 includes a repository of broadband audio datasets 321 which are used to automatically generate corresponding narrowband audio training datasets 322. In addition, the file storage database 320 includes one or more automatic speech recognition models 323 that are trained, respectively, on the broadband and narrowband audio datasets 321-322 in the file storage database 320. Each time a user or operator 301 uploads a new broadband audio datafile 302 to the file storage database 320, the new data file is detected by the new data detector module/service 311 which may be configured to monitor the file storage database 320 for any new storage entries. In addition, the new data detector module/service 311 may be configured to add new reference data to the database 330 which identifies the new broadband audio data file 302.

Once a new broadband audio data file 302 is detected, the call initiator module/service 312 in the telephony narrowband audio synthesizer system 310 initiates a telephony call. For example, the call initiator module/service 312 may be preconfigured to place a telephone call through the telephonic provider 320 to a designated phone number that can be received at or monitored by the synthesizer system 310. In addition, the call initiator module/service 312 may retrieve the new broadband data file 302 from the file storage database 320, alone or in combination with the corresponding data reference from the database 330.

Upon retrieving the new broadband data file 302, the audio player module/service 313 in the telephony narrowband audio synthesizer system 310 plays the new broadband data file 302 for transmission over the telephony call placed by the call initiator 312, and then terminates the telephony call upon completion of playback. In addition, the call recorder module/service 314 is activated to record the audio data received during the telephone call that was sent by the telephonic provider 320, thereby capturing a narrowband audio data version of the new broadband audio data file 302. As a result of routing the broadband audio data file through the telephonic provider 320, the received narrowband audio data includes both salient and non-salient features of the broadband audio data file that is dynamically compressed by the telephony call. And in contrast to existing tools for compressing or distorting the broadband audio file, such as by applying a uniform lossy speech coding, the use of the telephony call to transform the broadband audio provides a dynamic, real world mechanism for synthesizing narrowband telephony audio data.

Once the narrowband telephony audio data is captured, the narrowband data storage module/service 315 in the telephony narrowband audio synthesizer system 310 records the audio data in a narrow band format for storage as part of the recorded narrowband telephony audio dataset 322 in the file storage database 320. In addition, the narrowband data storage module/service 315 may be configured to add a data reference for the narrowband audio data in the database 330.

When recording of the synthesized narrowband telephony audio data is complete, the ASR training engine 316 in the telephony narrowband audio synthesizer system 310 may use the broadband audio dataset 321 and narrowband telephony audio dataset 322 to train the ASR model 323 to be able to understand and respond to human speech in a variety of environments and contexts.

Figure 4:
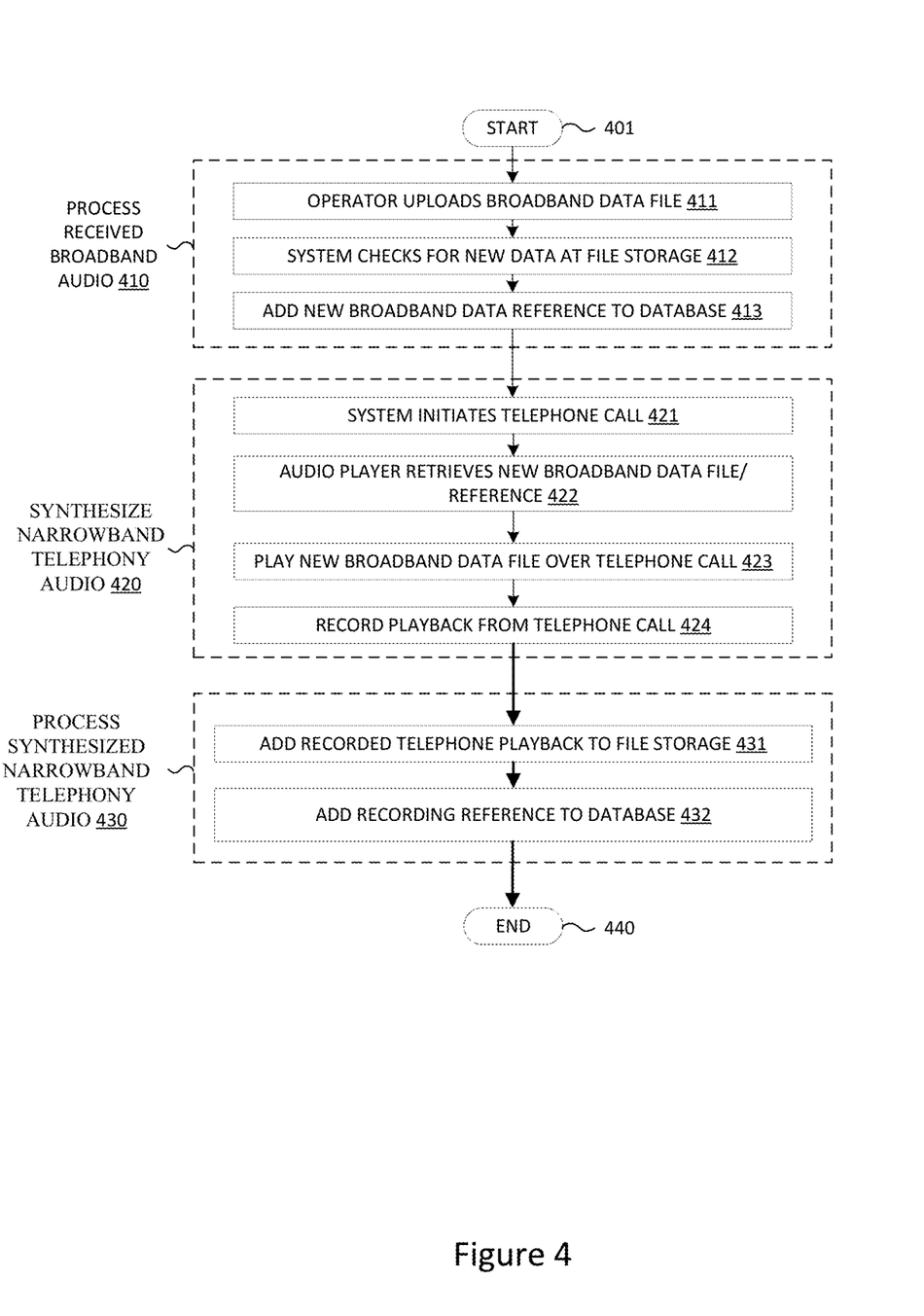
FIG. 4 depicts a simplified flow chart showing the logic for synthesizing narrowband telephony audio files in accordance selected embodiments of the present disclosure.

To provide additional details for an improved understanding of selected embodiments of the present disclosure, reference is now made to FIG. 4 which depicts a simplified flow chart 400 showing the logic for synthesizing narrowband telephony audio files. The processing shown in FIG. 4 may be performed in whole or in part by a cognitive system, such as the information handing system 100 or other natural language question answering system, which uses configured services to process received broadband audio 410, to synthesize narrowband telephony audio 420, and to process the synthesized narrowband telephony audio 430.

In the depicted process flow 400, processing commences at 401 which may occur during design and/or test time when a developer assembles training data in an automatic speech recognition training environment, such as the Watson Speech to Text service. At this point, the method steps 410, 420, 430 embody the functionality of a training data synthesis tool that uses a telephonic call to transform an input broadband audio file into a narrowband telephony audio data file that contains the same audio as the broadband audio files. As explained below, the training data synthesis tool uses a telephonic provider to place a telephone call, an audio player to play the broadband audio file over the telephone call, a recorder to capture and store the audio data received from the telephone call, and a data and/or file storage system for storing the audio data as a narrowband telephonic audio file and any relationship information between the audio files and phone call.

At step 410, one or more broadband audio files are processed to receive, store and index broadband audio data files that are stored in a first repository. The processing of broadband audio data files at step 410 may be performed at the information handling system 100 or telephony narrowband audio synthesizer system 310 by applying NLP processing, extraction algorithms, and/or file analysis techniques to each received broadband audio data file. As will be appreciated, one or more processing steps may be employed to process the received broadband audio data files.

For example, an operator may upload one or more broadband audio data files to a file storage at step 411. As will be appreciated, the file storage may be embodied as a first repository for storing a set of previously collected broadband audio files. In addition or in the alternative, the system may check for new data files in the file storage at step 412, such as by periodically monitoring the first repository for any new broadband audio entry that needs to be converted. In addition or in the alternative, the system may add reference data for any newly added broadband audio data file at step 413, such as by storing new broadband data reference information to a database or second repository. As disclosed herein, the processing at steps 411-413 may be performed at the information handling system 100 or telephony narrowband audio synthesizer system 310 by employing one or more NLP, extraction, and/or file analysis and storage algorithms to detect and process new broadband audio data files.

Once processing of a received broadband audio data file is complete, a narrowband telephony audio file is synthesized at step 420 by using a telephony provider to transform a received broadband audio data file into a synthesized narrowband telephony audio file. As disclosed herein, the generation of the synthesized narrowband telephony audio file may be performed at the information handling system 100 or telephony narrowband audio synthesizer system 310 using one or more automated processing steps to programmatically place a telephony call through a telephone provider for playback and recording of the new broadband audio data file. Examples of telephone providers include, but are not limited to a telecommunications provider (e.g., AT&T, Verizon, etc.), cloud communications platform (e.g., Twilio), voice over IP service, or other telephony infrastructure platform that provides connectivity between HTTP and the public switched telephone network (PSTN).

For example, the narrowband telephony audio synthesis processing at step 421 may employ a preconfigured system to initiate a telephone call through a designated telephone provider. In connection with the initiated call, an audio player may be configured to retrieve the new broadband audio data file and/or any associated reference data at step 422. In addition, the audio player is connected and configured to play the retrieved broadband audio data file over the initiated telephone call at step 423. In addition, the narrowband telephony audio synthesis processing at step 424 may be configured to record the audio playback of the broadband audio data file from the telephone call, thereby generating a synthesized narrowband telephony audio data file that corresponds to the new broadband audio data file. Once the playback and recording are completed, the preconfigured system may terminate the telephone call. As disclosed herein, the processing at steps 421-424 may be performed at the information handling system 100 or telephony narrowband audio synthesizer system 310 by employing a preconfigured telephonic provider to automatically generate downsampled, telephony narrowband files that contain the same audio as the broadband audio files.

At step 430, the synthesized narrowband telephony audio data file(s) are processed for storage. The storage processing of each synthesized narrowband telephony audio data file at step 430 may be performed using one or more processing steps at the information handling system 100 or telephony narrowband audio synthesizer system 310 by applying NLP processing, extraction algorithms, and/or file storage techniques to each synthesized narrowband telephony audio data file.

For example, the recorded telephone playback of a broadband audio data file from the telephone call may be stored in file storage at step 431. As will be appreciated, the file storage may be embodied as the first repository for storing the synthesized narrowband telephony audio data file along with the corresponding broadband audio file that was used to synthesize the recorded telephone playback. In addition or in the alternative, the system may add reference data for the synthesized narrowband telephony audio data file at step 432, such as by storing data reference information for the synthesized narrowband telephony audio data file to a database or second repository which stores the relationships between the audio files and phone calls. As disclosed herein, the processing at steps 431-432 may be performed at the information handling system 100 or telephony narrowband audio synthesizer system 310 by employing one or more NLP, extraction, and/or file analysis and storage algorithms to process and store the synthesized narrowband telephony audio data file.

At step 440, the process flow stops, and the synthesized narrowband telephony audio data files may be used a telephony version of the broadband audio file (i.e., a narrowband audio file) for training ASR models.

By now, it will be appreciated that there is disclosed herein a system, method, apparatus, and computer program product for generating synthetic telephony narrowband data for training an automatic speech recognition model with an information handling system having a processor and a memory. As disclosed, the system, method, apparatus, and computer program product monitors a first repository to detect a new broadband audio data file. Upon detecting the new broad band audio data file, the system initiates a telephony call that is placed using a pre-configured telephone provider, such as a telecommunications provider, a cloud communications platform, a voice over IP service, or a telephony infrastructure platform that provides connectivity between HTTP and a public switched telephone network (PSTN). In selected embodiments, the telephony call may be initiated by programmatically placing the telephony call through a telephone provider for playback and recording of the new broadband audio data file by the system. After playing the new broadband audio data file for transmission in the telephony call, the system terminates the telephony call placed by the pre-configured telephone provider. In selected embodiments, the transmission of the new broadband audio data file in the telephony call is performed by directly compressing all of the new broadband audio data file using the telephony call to generate a synthetic telephony narrowband data file. In addition, the system receives the telephony call to capture audio data generated by transmitting the new broadband audio data file in the telephony call. By recording the audio data for storage as an entry in a repository (e.g., the first repository or a second repository), the system generates and stores synthetic telephony narrowband data file corresponding to the new broad band audio data file project. In addition, the system may train the automatic speech recognition model using both the new broadband audio data file and the synthetic telephony narrowband data file.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors;
a set of instructions stored in the memory and executed by at least one of the processors to generate synthetic telephony narrowband data from a broadband audio data file, wherein the set of instructions are executable to perform actions of:
monitoring, by the system, a first repository to detect a new broadband audio data file;
upon detecting the new broadband audio data file, initiating, by the system, a telephony call that is placed using a pre-configured telephone provider to a designated phone number that can be received and/or monitored by the system;
playing, by the system, the new broadband audio data file for transmission in the telephony call;
receiving, by the system, the telephony call at the designated phone number to capture audio data generated by transmitting the new broadband audio data file in the telephony call;
recording, by the system, the audio data as a synthetic telephony narrowband data file corresponding to the new broadband audio data file project;
storing, by the system, the synthetic telephony narrowband data file as an entry in a second repository; and
terminating, by the system, the telephony call placed by the pre-configured telephone provider.

2. The information handling system of claim 1, wherein the set of instructions are executable to train an automatic speech recognition model using both the new broadband audio data file and the synthetic telephony narrowband data file.

3. The information handling system of claim 1, where the second repository is the first repository.

4. The information handling system of claim 1, wherein the set of instructions are executable to initiate the telephony call by programmatically placing the telephony call through a telephone provider for playback and recording of the new broadband audio data file by the system.

5. The information handling system of claim 1, where the pre-configured telephone provider comprises a telecommunications provider, a cloud communications platform, a voice over IP service, or a telephony infrastructure platform that provides connectivity between HTTP and a public switched telephone network (PSTN).

6. The information handling system of claim 1, wherein the set of instructions are executable to transmit the new broadband audio data file in the telephony call to directly compress all of the new broadband audio data file using the telephony call to generate a synthetic telephony narrowband data file.

7. A computer program product stored in a computer readable storage medium, comprising computer instructions that, when executed by a processor at an information handling system, causes the system to generate synthetic telephony narrowband data from a broadband audio data file for training an automatic speech recognition model by:
monitoring, by the system, a first repository to detect a new broadband audio data file;
upon detecting the new broadband audio data file, initiating, by the system, a telephony call that is placed using a pre-configured telephone provider to a designated phone number that can be received and/or monitored by the system;
receiving, by the system, the telephony call at the designated phone number to capture audio data generated by transmitting the new broadband audio data file in the telephony call;
recording, by the system, the audio data as a synthetic telephony narrowband data file corresponding to the new broadband audio data file project;
storing, by the system, the synthetic telephony narrowband data file as an entry in a second repository; and
terminating, by the system, the telephony call placed by the pre-configured telephone provider.

8. The computer program product of claim 7, further comprising computer instructions that, when executed by the system, cause the system to train the automatic speech recognition model using both the new broadband audio data file and the synthetic telephony narrowband data file.

9. The computer program product of claim 7, further comprising computer instructions that, when executed by the system, cause the system to initiate the telephony call by programmatically placing the telephony call through a telephone provider for playback and recording of the new broadband audio data file by the system.

10. The computer program product of claim 7, where the computer instructions are executed by the system to initiate the telephony call by placing the telephony call using a telecommunications provider, a cloud communications platform, a voice over IP service, or a telephony infrastructure platform that provides connectivity between HTTP and a public switched telephone network (PSTN).

11. The computer program product of claim 7, where the computer instructions are executed by the system to transmit the new broadband audio data file in the telephony call to directly compress all of the new broadband audio data file using the telephony call to generate a synthetic telephony narrowband data file.

* * * * *